(12) United States Patent
Zhong et al.

(10) Patent No.: US 12,229,440 B2
(45) Date of Patent: Feb. 18, 2025

(54) WRITE SHARING METHOD FOR A CLUSTER FILESYSTEM

(71) Applicant: INTERNATIONAL BUSINESS MACHINES CORPORATION, Armonk, NY (US)

(72) Inventors: Enci Zhong, Poughkeepsie, NY (US); Frank Schmuck, Campbell, CA (US); John Lewars, New Paltz, NY (US); D Scott Guthridge, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 18/327,094

(22) Filed: Jun. 1, 2023

(65) Prior Publication Data
US 2024/0402938 A1 Dec. 5, 2024

(51) Int. Cl.
*G06F 3/06* (2006.01)
*G06F 16/176* (2019.01)
*G06F 16/178* (2019.01)

(52) U.S. Cl.
CPC ............ *G06F 3/0656* (2013.01); *G06F 3/061* (2013.01); *G06F 3/064* (2013.01); *G06F 16/1774* (2019.01); *G06F 16/178* (2019.01)

(58) Field of Classification Search
None
See application file for complete search history.

(56) References Cited

U.S. PATENT DOCUMENTS

| | | | |
|---|---|---|---|
| 9,992,274 B2 | 6/2018 | Gunda | |
| 10,235,077 B2 | 3/2019 | Das | |
| 10,915,499 B2 | 2/2021 | Gaonkar | |
| 10,997,145 B2 | 5/2021 | Dole | |
| 11,003,385 B2 | 5/2021 | Kanno | |
| 11,409,712 B2 | 8/2022 | Du | |
| 2013/0159364 A1* | 6/2013 | Grider | G06F 16/1865 707/826 |
| 2017/0017680 A1 | 1/2017 | Jaakola | |
| 2017/0154039 A1 | 6/2017 | Crawford | |
| 2018/0255134 A1* | 9/2018 | Goli | H04L 67/1095 |
| 2019/0102087 A1* | 4/2019 | Shi | H04L 67/1097 |
| 2021/0240662 A1 | 8/2021 | Gupta | |

(Continued)

OTHER PUBLICATIONS

Ma et al. (Faster Collective Output through Active Buffering) IEEE 2002, pp. 1-8 (Year: 2002).*

(Continued)

*Primary Examiner* — Kaushikkumar M Patel
(74) *Attorney, Agent, or Firm* — Tihon Poltavets (57) ABSTRACT

Computer technology for use with a computer data storage system including a plurality of client computers and a plurality of collector nodes. A file consists of data blocks with each block resides on one of the persistent storage device. Data received at client computers are buffered and then transferred to selected collector nodes depending on which data blocks the data belong to. Location-aware collector node selection is performed by selecting collector nodes, from the plurality of collector nodes, by querying a file system allocation subsystem to determine selected collector nodes for the given data block that owns a persistent storage device on which the given block is allocated. Data for each data block is then sent to and stored in its selected collector nodes.

18 Claims, 6 Drawing Sheets

(56) References Cited

U.S. PATENT DOCUMENTS

2021/0334236 A1    10/2021   Wang
2022/0229589 A1     7/2022   Pang
2022/0398223 A1    12/2022   Zhong

OTHER PUBLICATIONS

Blas et al., "Implementation And Evaluation Of File Write-Back And Prefetching For MPI-IO Over GPFS", http://www.researchgate.net/publications/220457100_Implementation_ . . . , Feb. 2010, pp. 1-21.

Chen et al., "SeqDLM : A Sequencer-Based Distributed Lock Manager For Efficient Shared File Access In A Parallel File System", SC22, Nov. 13-18, 2022, IEEE, pp. 1-14.

Grace Period Disclosure, "IBM Spectrum Scale 5.1.4.0 Fix Readme", htttps://www.ibm.com/docs/en/storage-scale/5.1.4?topic=summary-changes, Jun. 2, 2023, pp. 1-10.

Koniges, "MPI-IO GPFS, an optimized implementation of MPI-IO on top of GPFS", https://www.researchgate.net/publication/4221986_MPI-IO_GPFS_an_optimized_implementation_of_MPI-IO_on_top_of_GPFS, Dec. 2001. pp. 1-16.

NERSC Documentation, "I/O Tuning", https://docs.nersc.gov/performance/io/library/, accessed Mar. 27, 2023, pp. 1-4.

Niazi, "Size Matters: Improving The Performance Of Small Files In Hadoop", http:/urn.kb.se/resolve?urn=urn:nbn:se:kth:diva-238597, presented at Middleware '18, ACM, Rennes, France, pp. 1-15.

Ouyang et al, "Fast Checkpointing By Write Aggregation With Dynamic Buffer And Interleaving On Multicore Architecture", The Ohio State University Department of Computer Science and Engineering, May 25, 2009, pp. 1-11.

Schmuck, "GPFS: A Shared-Disk File System for Large Computing Clusters", https://www.usenix.org/legacy/publications/library/proceedings/fast02/full_papers/schmuck/schmuck_html/index.html, accessed Mar. 27, 2023, pp. 1-19.

Tessier et al., "TAPIOCA: An I/O Library For Optimized Topology-Aware Data Aggregation On Large-Scale Supercomputers", https://www.researchgate.net/publication/320030336_TAPIOCA_An_I . . . , 2017 IEEE International Conference on Cluster Computing (CLUSTER), pp. 1-12.

Wautelet, "Best practices for parallel IO and MPI-IO hints", http://www.idris.fr/media/docs/docu/idris/idris_patc_hints_proj.pdf, CNRS-IDRIS, Mar. 5-6, 2015, pp. 1-35.

* cited by examiner

WRITE SHARING METHOD FOR A CLUSTER FILESYSTEM

STATEMENT REGARDING PRIOR DISCLOSURES BY THE INVENTORS' EMPLOYER AND ASSIGNEE

The following disclosure(s) and/or potential disclosures under 35 U.S.C. 102(b)(1)(A): Features of the present invention may have been included in the product IBM Spectrum Scale version 5.1.4 released no earlier than 2 Jun. 2022. There was an associated Summary Of Changes [for Spectrum Scale 5.1.4] describing some features of this new product which was published no earlier than 2 Jun. 2022 and which is being submitted by Information Disclosure Statement.

BACKGROUND

The present invention relates generally to the field of cluster filesystems, and more particularly to write sharing methods for cluster filesystems.

The Wikipedia entry for "clustered file system" (as of 22 May 2023) states, in part, as follows: "A clustered file system is a file system which is shared by being simultaneously mounted on multiple servers. There are several approaches to clustering, most of which do not employ a clustered file system (only direct attached storage for each node). Clustered file systems can provide features like location-independent addressing and redundancy which improve reliability or reduce the complexity of the other parts of the cluster. Parallel file systems are a type of clustered file system that spread data across multiple storage nodes, usually for redundancy or performance . . . . A shared-disk file system uses a storage area network (SAN) to allow multiple computers to gain direct disk access at the block level. Access control and translation from file-level operations that applications use to block-level operations used by the SAN must take place on the client node. The most common type of clustered file system, the shared-disk file system—by adding mechanisms for concurrency control—provides a consistent and serializable view of the file system, avoiding corruption and unintended data loss even when multiple clients try to access the same files at the same time. Shared-disk file-systems commonly employ some sort of fencing mechanism to prevent data corruption in case of node failures, because an unfenced device can cause data corruption if it loses communication with its sister nodes and tries to access the same information other nodes are accessing." (footnotes omitted)

In a shared-disk cluster file system, a parallel application performing non-overlapping small, unaligned strided writes presents a performance challenge for two reasons: (i) small writes executed individually result in inefficient use of the network and storage subsystem resources (since writes from different nodes are interleaved, they cannot be coalesced into larger writes at the originating node); and (ii) a write that is not aligned on block boundaries requires a read-modify-write of one or more disk blocks. This requires writes to the same block to be serialized across multiple writers even if those writes don't overlap at the byte-level ("false sharing"). This potentially results in significant performance degradation due to the overhead of distributed locking.

SUMMARY

According to an aspect of the present invention, there is a method, computer program product and/or system, for processing a small, interleaved write request in a cluster file system, that performs the following operations (not necessarily in the following order): (i) receiving, by a first node, a file system request; (ii) sending, by the first node, the file system request to a second node; and (iii) writing, by the second node, the file system request to persistent storage, wherein the second node is a server of a device comprising the persistent storage. Some embodiments may additionally include the following features, operations, advantages and/or characteristics: the file system request is a write request or a file synchronization request.

According to an aspect of the present invention, there is a method, computer program product and/or system, for processing a small, interleaved write request in a cluster file system, that performs the following operations (not necessarily in the following order): (i) receiving, by a first node, one or more file system requests; (ii) accumulating, by the first node, the one or more file system requests from one or more tasks into a single message; (iii) sending, by the first node, the single message to a second node; and (iv) writing, by the second node, the single message to persistent storage, wherein the second node is the a server of a device comprising the persistent storage. Some embodiments may additionally include the following features, operations, advantages and/or characteristics: the file system request is a write request or a file synchronization request.

According to an aspect of the present invention, there is a method, computer program product and/or system, for processing a small, interleaved write request in a cluster file system, that performs the following operations (not necessarily in the following order): (i) receiving, by a first node, one or more file system requests; (ii) sending, by the first node, the one or more file system requests to a second node; (iii) accumulating, by the second node, the one or more file system requests from one or more tasks into a full file system block; and (iv) writing, by the second node, the full file system block to persistent storage, wherein the second node is a server of a device comprising the persistent storage. Some embodiments may additionally include the following features, operations, advantages and/or characteristics: the file system request is a write request or a file synchronization request.

According to an aspect of the present invention, there is a method, computer program product and/or system, for use with a computer data storage system including a plurality of client computers and a plurality of collector nodes, including the following operations (not necessarily in the following order): (i) receiving, by a first client computer of the plurality of client computers, a plurality of write requests for a file that is to be collectively stored in the plurality of collector nodes; (ii) splitting the file into a plurality of data blocks and storing the data from the plurality of write requests in a set of client side buffer(s) in a volatile memory of the first client computer; (iii) for each given write request of the plurality of write requests, determine the data blocks the data belongs to; for each given data block performing location-aware collector node selection by selecting a collector node, from the plurality of collector nodes, by querying a file system allocation subsystem to determine which collector node is assigned to serve the given data block; and (iv) for each given write request of the plurality of write requests, sending the given data, from the first client computer through a communication network to the selected collector nodes for the given write requests.

DETAILED DESCRIPTION

This Detailed Description section is divided into the following subsections: (i) The Hardware and Software Environment; (ii) Example Embodiment; (iii) Further Comments and/or Embodiments; and (iv) Definitions.

I. The Hardware and Software Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1A:
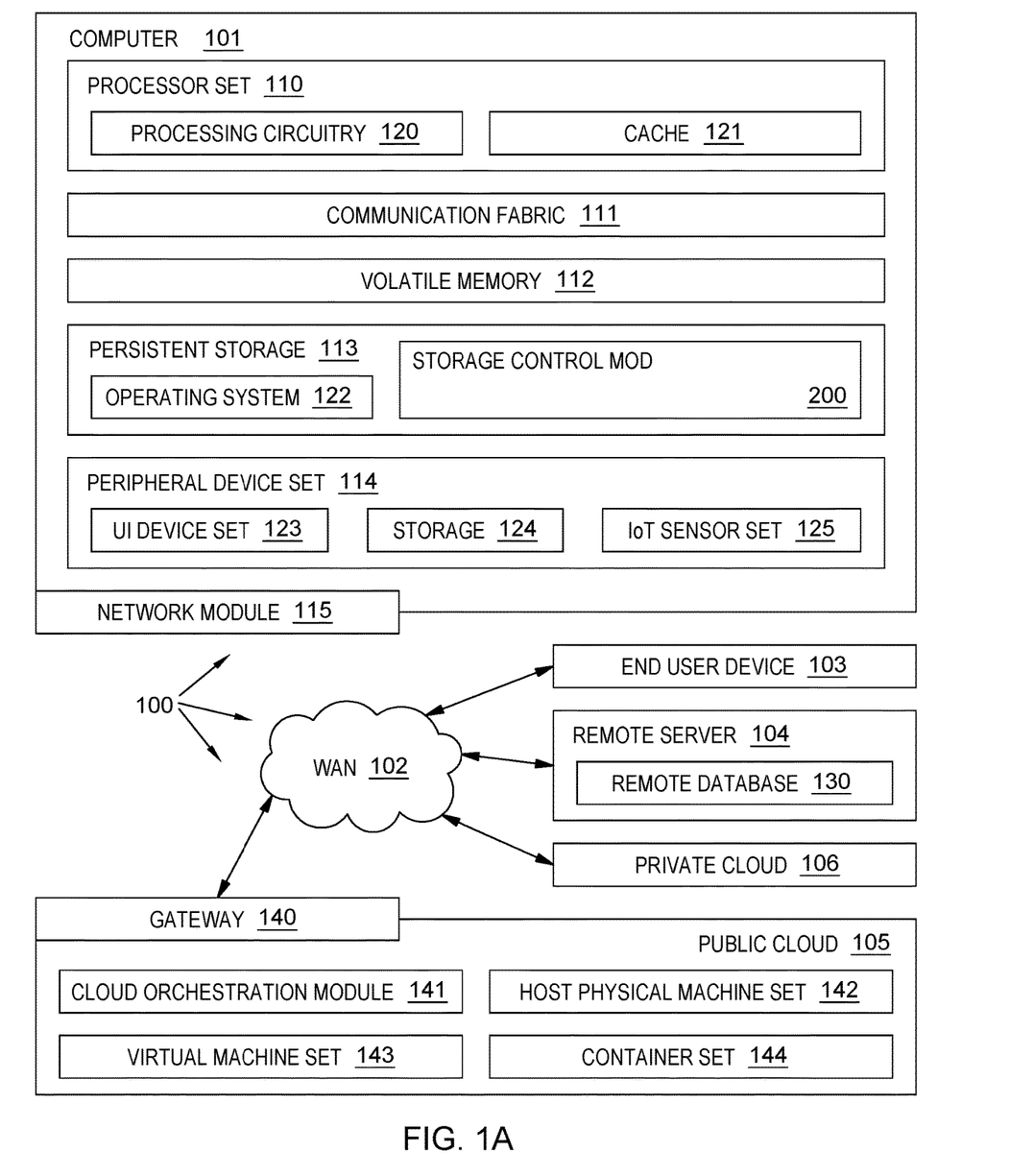
FIGS. 1A and 1B, taken together, form a block diagram of a first embodiment of a system according to the present invention.
Figure 1B:
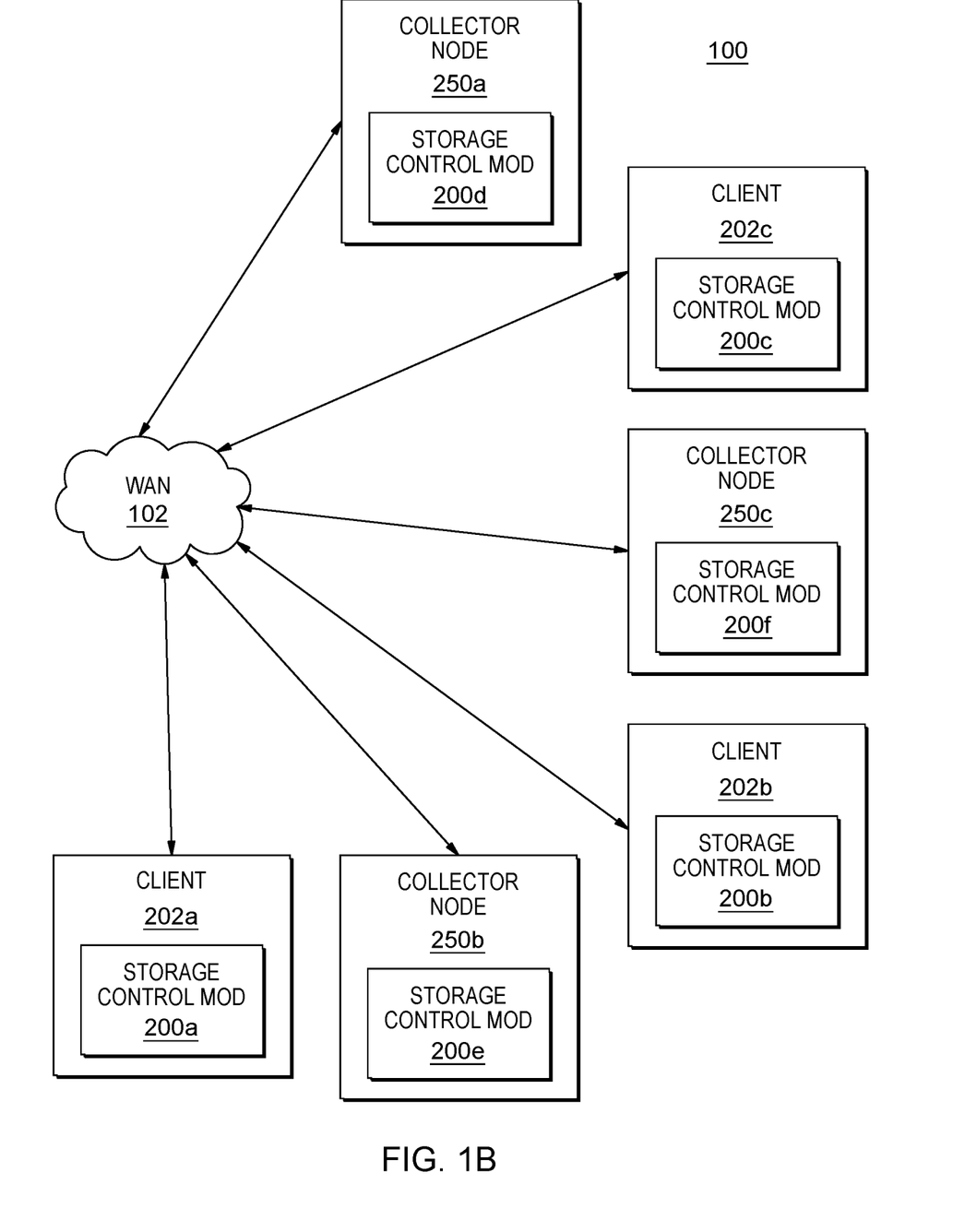

As shown in the first Figure of this document, computing environment 100 contains an example of an environment for the execution of at least some of the computer code involved in performing the inventive methods, such as storage control module ("mod") 200 (also herein sometimes referred to as block 200). In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

II. Example Embodiment

Figure 2:
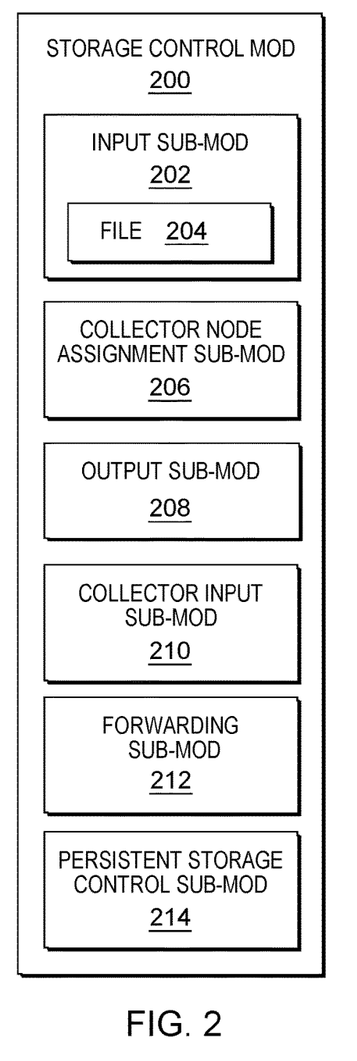
FIG. 2 is a flowchart showing a first embodiment method performed, at least in part, by the first embodiment system.
Figure 3:
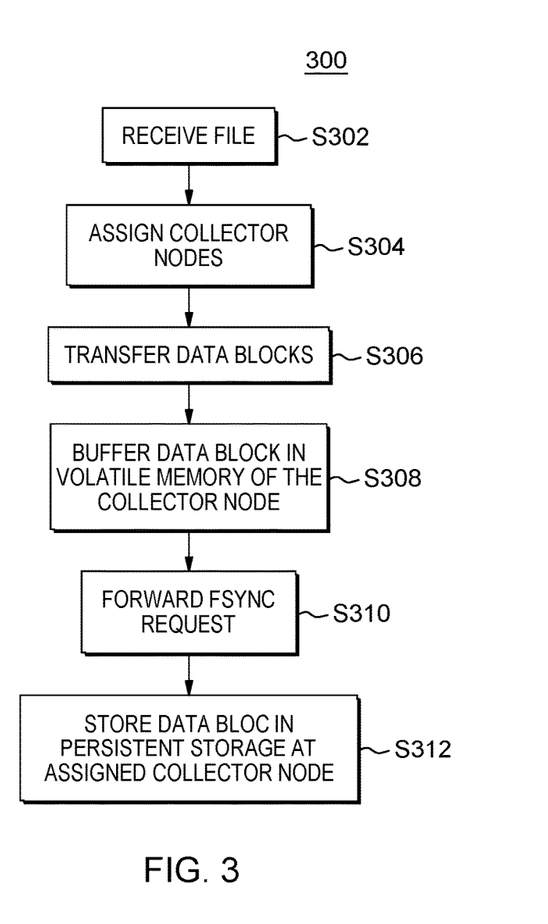
FIG. 3 is a block diagram showing a machine logic (for example, software) portion of the first embodiment system.

Computing environment 100 is an environment in which an example method according to the present invention can be performed. As shown in FIG. 3, flowchart 300 shows an example method according to the present invention. As shown in FIG. 2, storage control module 200 performs or controls performance of at least some of the method operations of flowchart 300. More specifically, block 200 is shown as being present in a generic computer in FIG. 1A and six instances of this block 200 are shown as blocks 200a to 200f respectively in client computers 202 a, b, c and collector nodes 250 a, b, c. As will be explained in this section, some of the sub-modules of storage control module 200 are used to control client computers (which receive data from application threads, buffer the data and then send the data to various collector nodes according to which data blocks they belong to), and other sub-modules of module 200 are used to control collector nodes (which receive and buffer data from clients and then store them in persistent storage to be served to various requesters later). This method and associated software will now be discussed, over the course of the following paragraphs, with extensive reference to the blocks of the first three figures.

Processing begins at operation S302, where input sub-module ("sub-mod") 202 of storage control mod 200a (see FIGS. 1B and 2) of client computer 202a receives data for file 204 including multiple write requests (not separately shown). Note: In FIG. 2, the data for file block 204 is labelled as file 204. This data is going to be stored by a set of server computers 250a, 250b and 250c (sometimes individually referred to as server nodes, or collector nodes).

Figure 4:
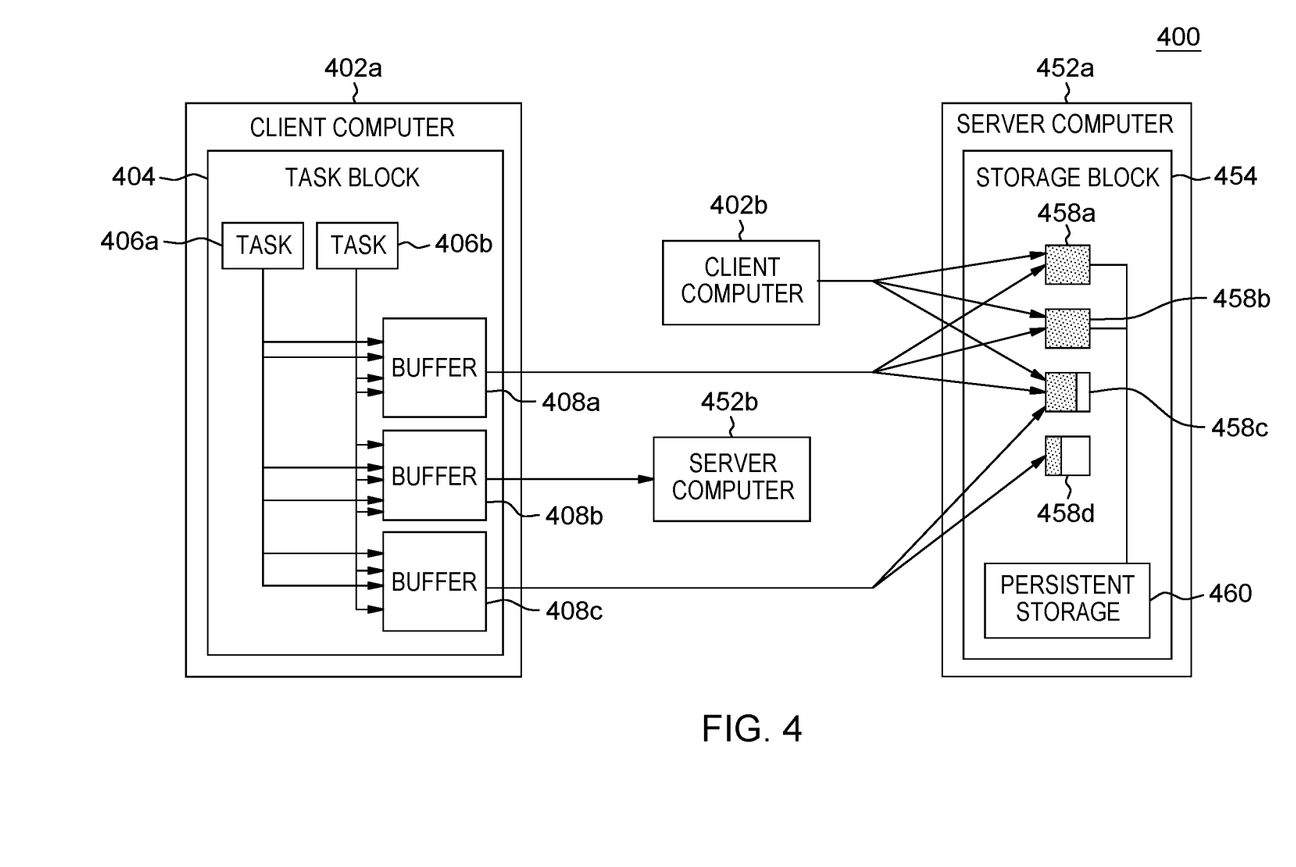
FIG. 4 is a block diagram of a second embodiment of a system according to the present invention.

In this embodiment, operation S302 includes the performance of client-side buffering by accumulating data from all tasks on a client node into client buffers (see FIG. 4). More specifically, each collector node 250 a, b, c available in the storage system is assigned one or more buffers in each client computer 202 a, b, c. This allows larger sized data transfers over the network for improved efficiency.

Operation S302 works with operation S304, where collector node assignment sub-mod 206 respectively assigns each data block of the file to a collector node 250 a, b, c. In some embodiments, data for multiple blocks destined to the same collector node can be used to fill the same client buffer. In some embodiments, each data block may be sent to a unique collector node.

In this embodiment, operation S304 collector node assignment sub-mod 206 implements location-aware collector node selection such that the file system allocation subsystem is queried and used to select collector nodes, so that the collector node for each given block is the same node as the storage server node that owns the persistent storage (for example, disk) on which the given block was or will be allocated. By performing location-aware collector node selection, in this embodiment of the present invention, data is coalesced directly on the storage server computer 250 a, b, c that will write the data, thereby avoiding the need for a second network hop in transferring the data to the correct server node for persistent storage of the given data block.

Operation S306 marks the beginning of a write operation. At operation S306, output sub-mod 208 of client computer 202a sends data buffers through WAN 102 (or other communication network) to various collector nodes 250 a, b, c according to the collector node assignments previously made at operation S304.

The forgoing operations are performed by client computers 202 a, b, c which originate data destined for file 204. The following operations are performed by collector nodes 250 a, b, c. At operation S308, collector input sub-mod 210 (see FIG. 2) of storage control mod 200d of collector node 250a (see FIG. 1B) receives the data from originating client computer 202a and (see FIG. 4) into server side buffers in memory of collector node 250a, from where it is eventually written to local persistent storage as full-block I/Os (input/output data portions) in collector node 250a by the following operations.

Processing proceeds to operation S310 where a client file-sync (fsync) request is forwarded by forwarding sub-mod 210 of storage control mod 200 to all collector nodes 250b, 250c through WAN 102.

Processing proceeds to operation S312, where the data block is passed by persistent storage control sub-mod 214 of storage control mod 200d of collector node 250a from a server side buffer (see FIG. 4) and into persistent storage in collector node 250a.

In this embodiment, storage control sub-mod 214 includes a buffering pre-assembly such that each collector node receives data from the client buffers of all client nodes and assembles the data into full file system data blocks, when possible, before passing data to the file system buffer cache. This potentially eliminates the need for read-modify-write and reduces file system write processing overhead. (Generally, the only case a full data block is not possible is at the end of a file when the file is not block-aligned.)

III. Further Comments and/or Embodiments

A method according to an embodiment of the present invention includes the following operations (not necessarily in the following order): (i) each data block of the file is assigned to a unique collector node; (ii) in response to write operations, client sends data to the collector node(s) for the file block(s) being written to; (iii) collector node writes client's data into server side buffers, from where it is eventually written to disk as full-block I/Os (input/output); (iv) client file-sync (fsync) request is forwarded to all collector nodes; (v) location-aware collector node selection is performed such that the file system allocation subsystem is queried and used to select collector nodes, so that the collector node for each block is the same node as the storage server node that serves the disk on which the block was or will be allocated. By performing operation (v) of this method, data is coalesced directly on the storage server that will write the data, thereby avoiding the need for a second network hop in transferring the data.

A method according to an embodiment of the present invention includes the following operations (not necessarily in the following order): (i) each data block of the file is assigned to a unique collector node; (ii) in response to write operations, client sends to the collector node(s) for the file block(s) being written to; (iii) collector node writes client's data into server side buffers, from where it is eventually written to disk as full-block I/Os (input/output); (iv) client file-sync (fsync) request is forwarded to all collector nodes; (v) performing client-side buffering by accumulating data from all tasks on a client node into client buffers, one or more buffers per collector node, to allow larger sized data transfers over the network for improved efficiency.

A method according to an embodiment of the present invention includes the following operations (not necessarily in the following order): (i) each data block of the file is assigned to a unique collector node; (ii) in response to write operations, client sends data to the collector node(s) for the file block(s) being written to; (iii) collector node write client's data into server side buffers, from where it is eventually written to disk as full-block I/Os (input/output); (iv) client file-sync (fsync) request is forwarded to all collector nodes; (v) buffering pre-assembly such that each I/O server receives data from the client buffers of all client nodes and assembles the data into full file system data blocks before passing data to the file system buffer cache. Operation (v) of the foregoing method potentially eliminates the need for read-modify-write and reduces file system write processing overhead.

A method according to an embodiment of the present invention includes the following operations (not necessarily in the following order): (i) each data block of the file is assigned to a unique collector node; (ii) in response to write operations, client sends data to the collector node(s) for the file block(s) being written to; (iii) collector node writes client's data into server side buffers, from where it is eventually written to disk as full-block I/Os (input/output); (iv) client file-sync (fsync) request is forwarded to all collector nodes; (v) performing flow control on both the client and server to ensure coordinated progress across all tasks, and addressing performance inefficiencies of per write MPI-IO flow control such that the level of granularity is not limited to per write operations. It is noted that traditional GPFS (general parallel file system) data shipping conventionally does not have any flow control and depends on MPI-IO for data placement. MPI-IO is a portable interface defined by the Message Passing Interface (MPI) Forum in order to perform parallel I/O operations within distributed memory programs, leveraging MPI key concepts such as communicators, datatypes, and collective operations.

A method according to an embodiment of the present invention includes the following operations (not necessarily in the following order): (i) each data block of the file is assigned to a unique collector node; (ii) in response to write operations, client sends data to the collector node(s) for the file block(s) being written to; (iii) collector node write client's data into server side buffers, from where it is eventually written to disk as full-block I/Os (input/output); (iv) client file-sync (fsync) request is forwarded to all collector nodes; (v) File-sync batching is performed to improve efficiency. The overhead of each task closing the shared file and synchronizing updates to disk are handled in a batch manner rather than on a per task basis.

Some embodiments of the present invention may include one, or more, of the following operations, features, characteristics and/or advantages: (i) recovery from collector node failures such that the client keeps buffered data until known to be persistent, and, on a collector node failure, the client resends buffered data to an alternate collector node; (ii) application transparent data shipping such that the fine grain write sharing optimizations can be either enabled explicitly by the application or they can be automatically enabled at the file system layer by detecting the access pattern—as the workload progresses, the file system code can verify that the optimization continues to apply to the access pattern; and/or (iii) use strong consistency checks to detect concurrent access from other applications (not using data shipping) and flush buffered writes to ensure data consistency for concurrent accesses.

As shown in FIG. 4, computer system 400 which transfers data from buffers in volatile memories of client computers to buffers in volatile memories in server computers, and then stores the data in persistent storage in the server computers. Tasks generate data which is first stored in memory buffers on the client side. The server computers flush data blocks to persistent storage (for example, disks) on a block by block basis as each block in a server side buffer becomes full. Computer system 400 includes client computer 402a; client computer 402b; task block 404; task 406a; task 406b; client buffer 408a; client buffer 408b; client buffer 408c; server computer 452a; server computer 452b; server buffer 458a, server buffer 458b; server buffer 458c; server buffer 458d; and persistent storage 460. During write operations, the data in the client side buffers (buffers in client computers 402a and 402b) is transferred to the buffers of the server computers 452a and 452b to be written to storage devices. Tasks 406a and 406b are computer processes participating in a fine grain write sharing application. Client computers 402a and 402b are nodes on which one or more fine grain write sharing application tasks run. Client buffers 408a, 408b and 408c are buffers (in random access memory, not separately shown) on which data from a fine grain write sharing application are accumulated. Server computers 452a and 452b are nodes on which data from client buffers is sent to so the data can be written to storage. Server buffers 458a, 458b, 458c and 458d are buffers (in random access memory, not separately shown) on which data is assembled into full blocks before being written to persistent storage included in a server computer system.

A method performed in an embodiment of the present invention when user data is copied into client buffers includes the following operations: (i) a task needs to write some data of certain length at a certain file offset; (ii) check which block(s) the data belongs to and find the optimal server(s); and (iii) copy the user data into buffers destined to the optimal server(s); (iv) send metadata for client buffers to their destined servers when ready (the metadata includes length and file offset for each piece of data).

A method performed in an embodiment of the present invention, performed when servers have full block buffers ready based on metadata received from clients, includes the following operations: (i) servers receive data from client buffers into server side buffers; (ii) servers retrieve user data from client buffers into data blocks; and (iii) the data blocks are flushed to disks when full.

Figure 5:
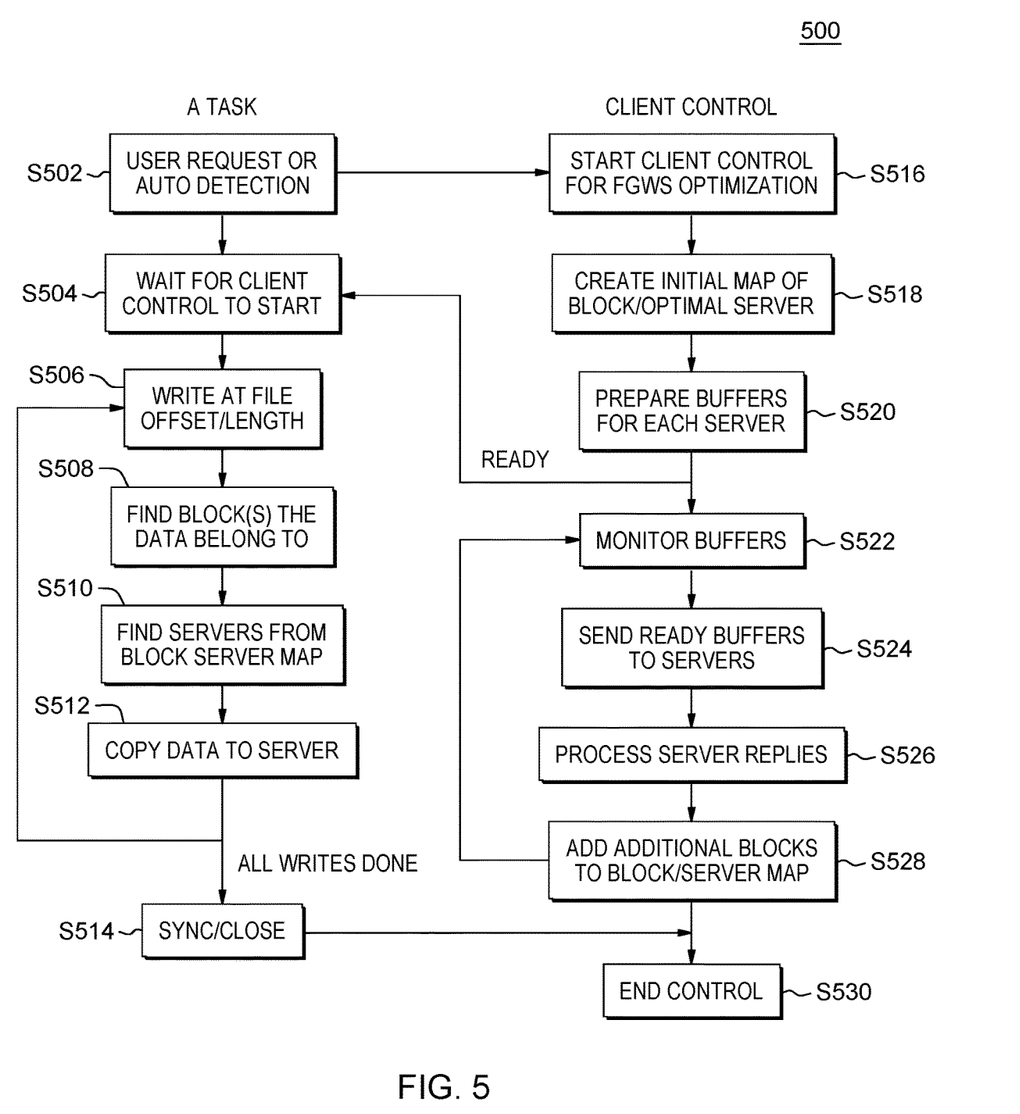
FIG. 5 is a flowchart showing a second embodiment method according to the present invention.

As shown in FIG. 5, flowchart 500 shows a method for performing client side operations and client side flow control. The method of flowchart 500, with the process flow among and between the operations as shown by arrows in FIG. 5, includes the following operations: operation S502; operation S504; operation S506; operation S508; operation S510; operation S512; operation S514; operation S516; operation S518; operation S520; operation S522; operation S524; operation S526; operation S528; operation S530; and operation S532. In the method of flowchart 500, the client computers apply flow control as long as each task is writing continuously to increasing file offsets. This prevents one task from getting too far ahead of the other tasks, which would otherwise result in too many partially filled buffers on the server. A block window size is chosen, based on the possible number of workers and buffers. The window size determines the highest block number of the window based on the lowest block number the application is to write to. When all tasks have written a fraction of the window size, increase the highest block number of the window by the same number of blocks. When a task writes to a block below the highest block number of the window, proceed copying the user data to the right buffer. When a task writes to a block at or beyond the highest block number of the window, wait until the highest block number of the window move up.

Figure 6:
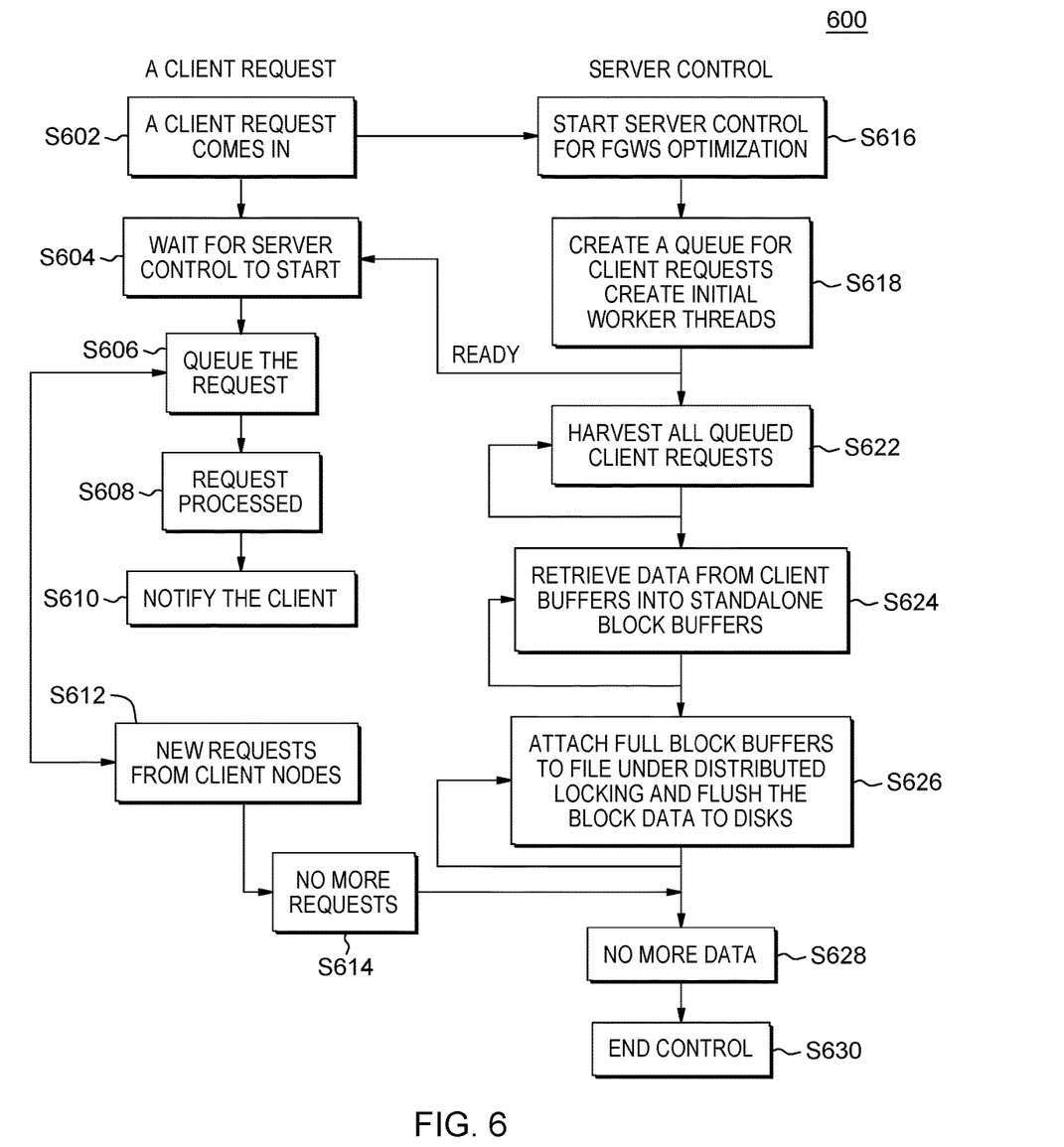
FIG. 6 is a flowchart showing a third embodiment method according to the present invention.

As shown in FIG. 6, flowchart 600 shows a method for performing server side operations and server side flow control. The method of flowchart 600, with process flow among and between the operations as shown by arrows in FIG. 6, includes the following operations: operation S602; operation S604; operation S606; operation S608; operation S610; operation S612; operation S614; operation S616; operation S618; operation S622; operation S624; operation S626; operation S628; and operation S630. In the method of flowchart 600, each server in the system applies flow control as long as each client node is writing continuously to increasing file offsets. This prevents one client node from getting too far ahead of the other client nodes, which will result in too many partially filled buffers on the server. A block window size is chosen, based on the possible number of workers and buffers. The window size determines the highest block number of the window based on the lowest block number the application is to write to. Each server harvests all incoming client requests, queues the requests under the blocks the data belong to. Those blocks below the highest block number of the window are processed immediately, while those beyond are held for later processing after the window moves. When the blocks being processed become full, move the window to increase the highest block number of the window. When all data for a client buffer has been processed, notify the client so that the client data buffer can be reused.

An embodiment for a method of data recovery, according to an embodiment of the present invention will now be set forth: (i) a client sends data to a server when a client buffer is full of data; (ii) the server notifies the client when all the client data has been flushed to disks; and (iv) in case the server fails to flush all client data to disks, or if network failures cause unsuccessful sending of the client request, redirect the request to another server.

An embodiment for a method of sync optimization, according to an embodiment of the present invention will now be set forth: (i) when an application task calls fsync( ) or close( ) wait until all tasks of the application on the client call fsync( ) or close( ) or a sufficiently long time occurs after the fsync( ) or close( ) call is called by the first client thread (timeout condition); (ii) one of the tasks will proceed sending all client buffers to servers, before sending the sync requests to every server. When a reply is received from all servers indicating that the sync request has been processed, then all tasks calling sync( ) or close( ) on the client will proceed to finish the sync( ) or close( ) call; (iii) in case some tasks are late calling close( ) or sync( ) (timeout condition described above), the sync can be done in more than one batch; and (iv) only after new data have been written since the previous sync by all tasks, will the next sync be initialized when sync( ) or close( ) is called.

Some embodiments of the present invention may include one, or more, of the following operations, features, characteristics and/or advantages: (i) sync optimization is performed at the server side; (ii) a server keeps track of the number of unique clients sending requests to it; (iii) when a sync request is received from a client, it will wait till all clients have sent a sync request, or timeout condition occurs; (iv) then the server will make sure all pending data has been flushed to disks; (v) the server notifies all clients sending the sync request that the sync request is done; and (vi) in case some clients are slower, sync can be done in more than one batch.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above-similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Set of thing(s): does not include the null set; "set of thing(s)" means that there exist at least one of the thing, and possibly more; for example, a set of computer(s) means at least one computer and possibly more.

What is claimed is:

1. A computer-implemented method for use with a computer data storage system including a plurality of client computers and a plurality of collector nodes, the computer-implemented method comprising:
    receiving, by a first client computer of the plurality of client computers, a plurality of write requests for a file that is to be collectively stored in the plurality of collector nodes;
    storing the data from the plurality of write requests in a set of client side buffers in a volatile memory of the first client computer;
    splitting the file into a plurality of data blocks;
    for each given write request of the plurality of write requests, determining the data blocks to which the data belongs;
        for each given data block, performing location-aware collector node selection by selecting a collector node, from the plurality of collector nodes, by querying a file system allocation subsystem to determine which collector node is assigned to serve the given data block; and
        for each given write request of the plurality of write requests, sending the given data, from the first client computer through a communication network to the selected collector nodes for the given write requests.

2. The computer-implemented method of claim 1 further comprising:
    for each given data block, storing, by the selected collector node that serves the given data block, the given data block in a persistent storage device.

3. The computer-implemented method of claim 1 further comprising:
    for each given data block, storing, by the selected collector node that serves the given data block, the given data block in buffer pre-assembly in volatile memory of the selected collector node for the given data block; and
    for each given data block, transferring, by the selected collector node that serves the given data block, the given data block to a persistent storage device that is accessible by the selected collector node.

4. The computer-implemented method of claim 1 further comprising:
    buffering by buffering pre-assemblies such that each collector node that receives data from client buffers of the plurality of client computers;
    for at least some given data blocks of the plurality of data blocks and after having collected data for the given data block from all client nodes, assembling the given data block of the plurality of data blocks into a full file system data block to obtain a plurality of full file system blocks; and
    transferring the plurality of full file system data blocks to persistent storage devices to eliminate a need for read-modify-write and to reduce file system write processing overhead.

5. The computer-implemented method of claim 1 further comprising:
    performing flow control on both the plurality of client computers and the plurality of collector nodes to achieve block level granularity in the control of the flow of data stored in persistent storage devices served by the collector nodes.

6. The computer-implemented method of claim 1 further comprising:
    performing file-sync batching to improve efficiency, an overhead of each task closing a shared file and synchronizing updates to persistent storage devices of the collector nodes are handled in a batch manner, with each batch including a plurality of tasks.

7. A computer program product for use with a computer data storage system including a plurality of client computers and a plurality of collector nodes, the computer program product comprising:
    a set of storage devices; and
    computer code stored collectively in the set of storage devices, with the computer code including data and instructions to cause a processor set to perform:
        receiving, by a first client computer of the plurality of client computers, a plurality of write requests for a file that is to be collectively stored in the plurality of collector nodes;
        storing the data from the plurality of write requests in a set of client side buffers in a volatile memory of the first client computer;
        splitting the file into a plurality of data blocks;
        for each given write request of the plurality of write requests, determining the data blocks to which the data belongs;
        for each given data block, performing location-aware collector node selection by selecting a collector node, from the plurality of collector nodes, by querying a file system allocation subsystem to determine which collector node is assigned to serve the given data block; and
        for each given write request of the plurality of write requests, sending the given data, from the first client computer through a communication network to the selected collector nodes for the given write requests.

8. The computer program product of claim 7 wherein the computer code further includes instructions for causing the processor set to perform the following operation:
    for each given data block, storing, by the selected collector node that serves the given data block, the given data block in a persistent storage device.

9. The computer program product of claim 7 wherein the computer code further includes instructions for causing the processor set to perform the following operations:
    for each given data block, storing, by the selected collector node that serves the given data block, the given data block in buffer pre-assembly in volatile memory of the selected collector node for the given data block; and for each given data block, transferring, by the selected collector node that serves the given data block, the given data block to a persistent storage device that is accessible by the selected collector node.

10. The computer program product of claim 7 wherein the computer code further includes instructions for causing the processor set to perform the following operations:

buffering by buffering pre-assemblies such that each collector node that receives data from client buffers of the plurality of client computers;

for at least some given data blocks of the plurality of data blocks and after having collected data for the given data block from all client nodes, assembling the given data block of the plurality of data blocks into a full file system data block to obtain a plurality of full file system blocks; and transferring the plurality of full file system data blocks to persistent storage devices to eliminate a need for read-modify-write and to reduce file system write processing overhead.

11. The computer program product of claim 7 wherein the computer code further includes instructions for causing the processor set to perform the following operation:

performing flow control on both the plurality of client computers and the plurality of collector nodes to achieve block level granularity in the control of the flow of data stored in persistent storage devices served by the collector nodes.

12. The computer program product of claim 7 wherein the computer code further includes instructions for causing the processor set to perform the following operation:

performing file-sync batching to improve efficiency, an overhead of each task closing a shared file and synchronizing updates to persistent storage devices of the collector nodes are handled in a batch manner, with each batch including a plurality of tasks.

13. A computer system for use with a computer data storage system including a plurality of client computers and a plurality of collector nodes, the computer system comprising:

processor set;

a set of storage devices; and computer code stored collectively in the set of storage devices, with the computer code including data and instructions to cause the processor set to perform:

receiving, by a first client computer of the plurality of client computers, a plurality of write requests for a file that is to be collectively stored in the plurality of collector nodes;

storing the data from the plurality of write requests in a set of client side buffers in a volatile memory of the first client computer;

splitting the file into a plurality of data blocks;

for each given write request of the plurality of write requests, determining the data blocks to which the data belongs;

for each given data block, performing location-aware collector node selection by selecting a collector node, from the plurality of collector nodes, by querying a file system allocation subsystem to determine which collector node is assigned to serve the given data block; and for each given write request of the plurality of write requests, sending the given data, from the first client computer through a communication network to the selected collector nodes for the given write requests.

14. The computer system of claim 13 wherein the computer code further includes instructions for causing the processor set to perform the following operation:

for each given data block, storing, by the selected collector node that serves the given data block, the given data block in a persistent storage device.

15. The computer system of claim 13 wherein the computer code further includes instructions for causing the processor set to perform the following operations:

for each given data block, storing, by the selected collector node that serves the given data block, the given data block in buffer pre-assembly in volatile memory of the selected collector node for the given data block; and for each given data block, transferring, by the selected collector node that serves the given data block, the given data block to a persistent storage device that is accessible by the selected collector node.

16. The computer system of claim 13 wherein the computer code further includes instructions for causing the processor set to perform the following operations:

buffering by buffering pre-assemblies such that each collector node that receives data from client buffers of the plurality of client computers;

for at least some given data blocks of the plurality of data blocks and after having collected data for the given data block from all client nodes, assembling the given data block of the plurality of data blocks into a full file system data block to obtain a plurality of full file system blocks; and transferring the plurality of full file system data blocks to persistent storage devices to eliminate a need for read-modify-write and to reduce file system write processing overhead.

17. The computer system of claim 13 wherein the computer code further includes instructions for causing the processor set to perform the following operation:

performing flow control on both the plurality of client computers and the plurality of collector nodes to achieve block level granularity in the control of the flow of data stored in persistent storage devices served by the collector nodes.

18. The computer system of claim 13 wherein the computer code further includes instructions for causing the processor set to perform the following operation:

performing file-sync batching to improve efficiency, an overhead of each task closing a shared file and synchronizing updates to persistent storage devices of the collector nodes are handled in a batch manner, with each batch including a plurality of tasks.

* * * * *